(No Model.) 2 Sheets—Sheet 1.

P. LELARDOUX.
ROLLER PRESS FOR EXTRACTING OIL FROM COTTON SEED, &c.

No. 595,022. Patented Dec. 7, 1897.

WITNESSES:
M. J. Leonard
M. Lelardoux

INVENTOR
Pierre Lelardoux

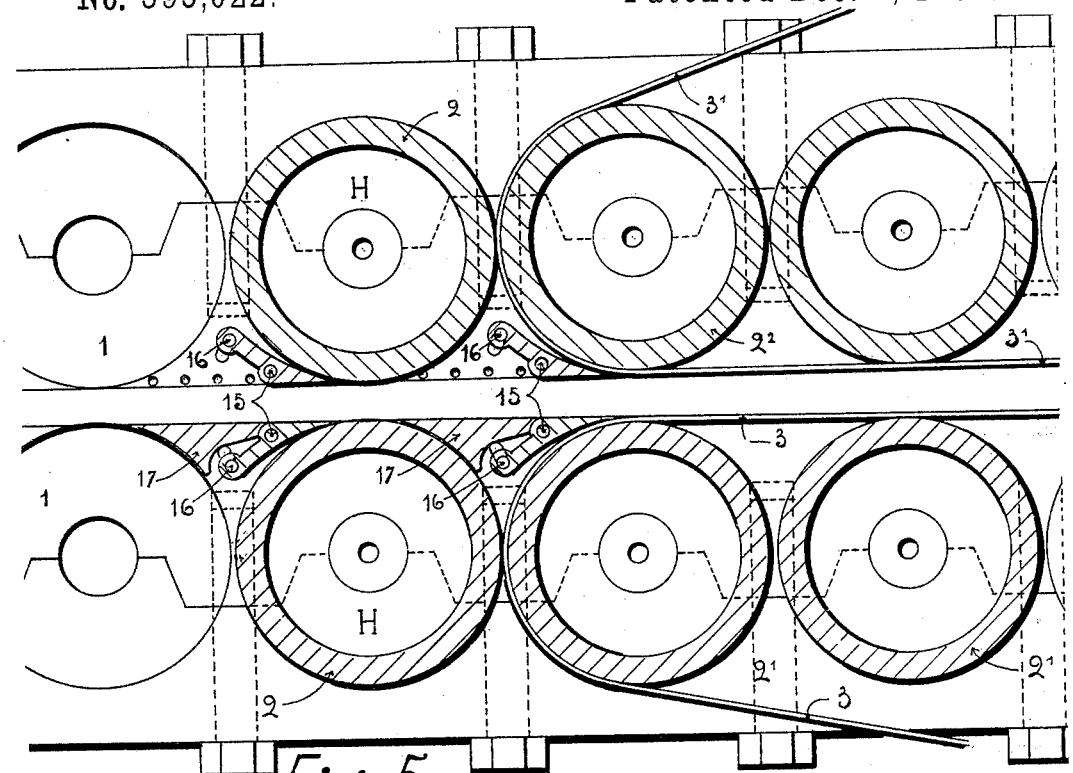
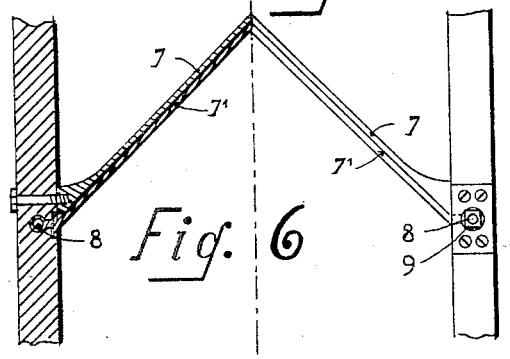
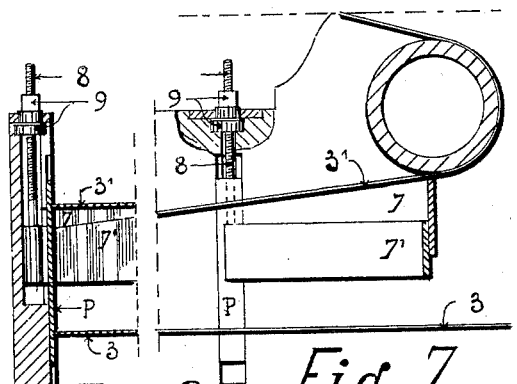
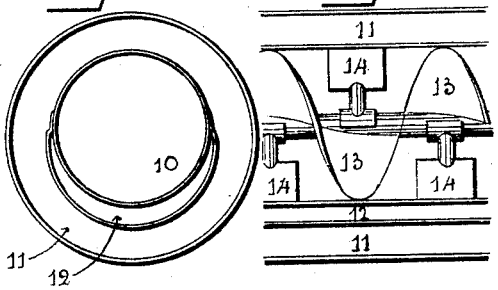

UNITED STATES PATENT OFFICE.

PIERRE LELARDOUX, OF DENISON, TEXAS.

ROLLER-PRESS FOR EXTRACTING OIL FROM COTTON-SEED, &c.

SPECIFICATION forming part of Letters Patent No. 595,022, dated December 7, 1897.

Application filed July 13, 1897. Serial No. 644,437. (No model.)

*To all whom it may concern:*

Be it known that I, PIERRE LELARDOUX, a citizen of the United States, residing at Denison, in the county of Grayson and State of Texas, have invented a Roller-Press for the Extraction of Oil from Cotton and other Seeds, of which the following is a specification.

My invention relates to a press that is continuous and automatic in its action and in which the meal properly heated is fed into a hopper, and from thence conducted, by means of belts, to a double series of parallel rollers set horizontally and so that the space between the upper and lower series becomes gradually smaller. These rollers are heated by steam or otherwise, and the meal is crushed and pressed between them, and the extracted oil falls into an inclined trough below. The amount of pressure is regulated by the amount of meal admitted between the rollers and the time of pressing by the number of rollers. The speed of the rollers regulates the output. The cake as it comes out of the press can be received directly by a grinding-machine or cut up into pieces of the desired sizes by saws or cutters.

The frame of the press, the rollers, hopper, and other fixtures are made of metal, preferably of steel. The belts may be made of any suitable material, such as rubber, leather, &c., but preferably of metal—soft steel or aluminium.

I attain the objects of my invention by the mechanical devices illustrated in the accompanying drawings, of which a brief description follows.

Figure 1:
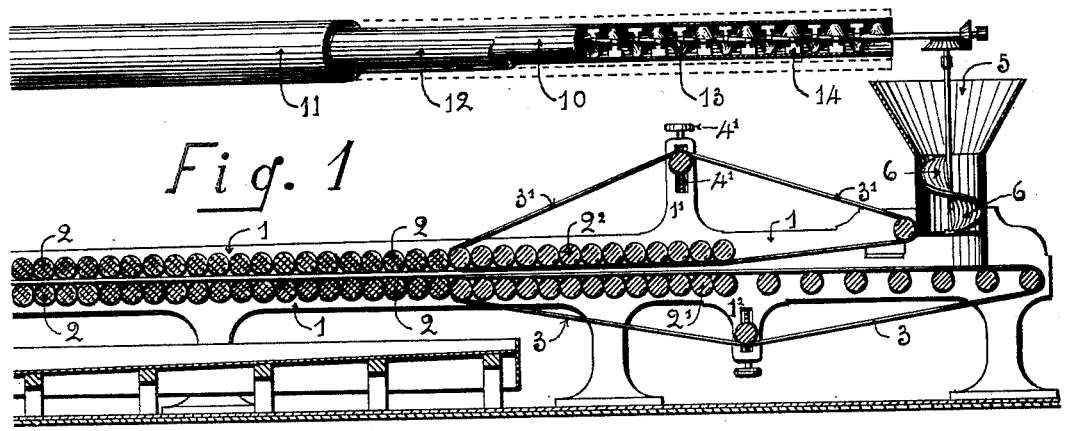
Figure 2:
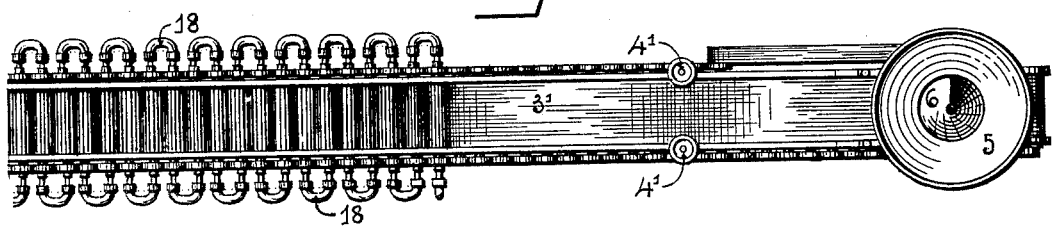
Figure 3:
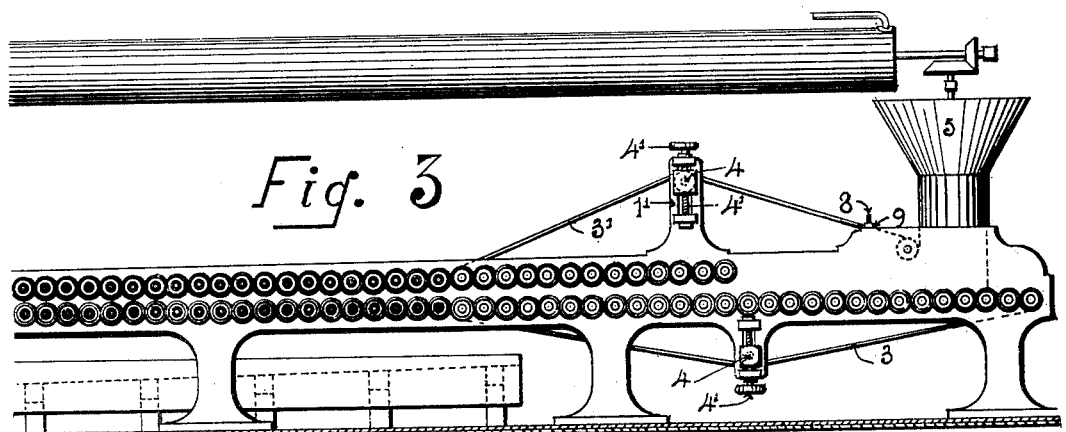
Figure 4:
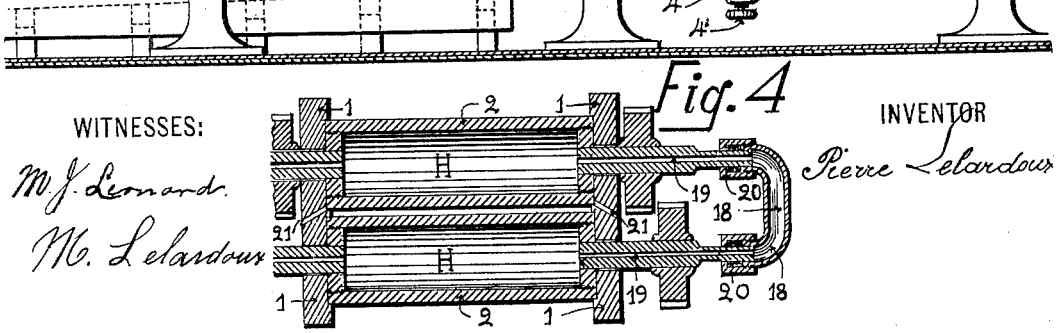

Figure 1 is a vertical longitudinal section of the press, showing the meal-receiving hopper and the feeding and cooking conveyer. Fig. 2 is a horizontal top view of press. Fig. 3 is a side view of press. Fig. 4 is a detail cross-section of press, showing a set of superposed rollers. Fig. 5 is a detail vertical longitudinal section of part of press, showing the end of conveying-belts and the first crushing-rollers. Fig. 6, at its left side, is a detailed horizontal section of leveling and regulating gage and at its right side is a top view of leveling and regulating gage. Fig. 7 is a detail vertical longitudinal section of leveling and regulating gage. Fig. 8 is a detail vertical longitudinal section through the meal "cooking" and feeding apparatus. Fig. 9 is a transverse vertical section of meal cooking and feeding apparatus.

In the accompanying drawings the same reference letters and numerals represent identical parts.

The frame 1, supporting the rollers, is made in three parts, with joints at center of roller-bearings to allow the rollers to be put in and taken out. These parts are held together by bolts, as shown, Fig. 5. The frame forms the sides of the press and is set at a proper height from the floor and firmly secured to it.

The rollers 2, 2', and $2^2$ are arranged in two series, one above the other, the rollers of the upper series plumb and forming pairs with the rollers of the lower series. The series of rollers are set on planes slightly convergent toward the outer end of the press, (left-hand side on the drawings,) so that the space between them gets gradually smaller. The front rollers of the lower series 2' carry a conveying-belt 3 and the front rollers of the upper series $2^2$ a conveying-belt 3'. Each belt is provided with a tightening-box 4 and 4', supported by frame extensions 1' and $1^2$.

At the front end of the press is fixed a hopper 5, which receives the meal from the cooking and feeding apparatus and delivers it to the conveying-belts by means of the rotary helical blades 6. A leveling and regulating gage is composed of a stationary part 7, the upper edge of which fits the upper belt 3', and of an adjustable part 7', placed on the inside and close to the lower edge of the stationary part at a proper distance above the lower belt 3. The adjustable part 7' is fastened on each side to rods 8, which move up and down inside of recesses provided in the frame 1 of the press. The rods are threaded at the upper end and are worked by set-nuts 9, secured to the frames. By turning the set-nuts the adjustable part 7' of the gage is raised or lowered. The gage makes horizontally an angle forward to throw the meal toward the sides and distribute it evenly. The distance between the lower belt 3 and the gage 7' regulates the thickness of the body of meal carried to the press. The opening of the recess in which the rod 8 works is covered on the inside of the press by a plate P, attached to 7' and sliding over said opening to prevent the meal from entering the recess. The meal is heated to the proper degree, and "cooked" in the conveying-pipe 10 by circulating steam or hot air in the heating-chamber 11, extending around the conveying-pipe. As the meal lies at the bottom of the conveying-pipe and might get overcooked or "roasted" by being in contact with the wall of the heating-chamber, a circulation of air at the proper temperature may be maintained in the chamber 12. The helical conveyer 13 is provided with paddles 14 to stir the meal and secure an even cooking. The meal as it leaves the belts and passes between the rollers is prevented from adhering to the belts and rollers by scrapers pivoted at 15 and adjustable by bolts in slots 16. These scrapers extend from one side of the press to the other. The plates 17, also extending from side to side of the press, form, in connection with the scrapers, a continuous support for the meal between two successive rollers.

The crushing-rollers 2 are hollow and form heating-chambers H, through which circulates steam or hot air supplied by the pipes 18 and the hollow shafts 19, which turn in the packing-boxes 20. The rollers of the same series all turn in the same direction, the two series working the meal or "cake" from front to back of the press. The rollers are turned by cog-wheels (every other one on the same side being loose on the roller-shaft) or by pulleys and belts, as most suitable, and the two series at the same speed or one series faster than the other.

Drain-holes 21 are provided in the two sides of the press for the escape of the oil from the top of the cake. An inclined trough 22 is placed under the press to receive the oil.

This roller-press works as follows: The meal is supplied to the press in a continuous manner and properly cooked by the cooking and feeding apparatus, which drops it into the hopper. Inside of the hopper works a vertical helical blade which presses the meal on the conveying lower belt. This belt moves toward the crushing-rollers and carries with it the meal. The gage spreads the meal evenly on the belt and regulates the thickness. Some distance behind the gage the meal meets the upper belt and then begins to be compressed. Its thickness is reduced and it gets more and more compact as it goes on, and when it gets to the end of the belts it is hard enough to form "cake" and is then caught by the heated crushing-rollers, which carry it to the end of the press. The space between the series of rollers becomes gradually smaller and the pressure on the cake is gradually increased. When the pressure is sufficient, the oil flows from the cake, dripping directly from the under side and from the upper side finding its way through the drain-holes in the sides of the press.

The speed of the rollers is fixed to regulate the output of the press, and the speed of the cooking and feeding apparatus to suit the demand of the rollers.

The length of time that the cake shall remain under pressure is regulated by the length of the press, (the number of rollers,) and the amount of pressure by the thickness of the body of the meal admitted by the gage. The thickness of the cake is determined by the distance between the series of rollers at the outer end of the press.

The conveying-belts are extended back far enough to insure a proper hardness of the cake when fed to the crushing-rollers.

A difference of speed between the two series of rollers is preferable because it produces a grinding and tearing motion, which favors the extraction of oil by disengaging the oil-molecules from the surrounding particles.

Having described my invention and explained its way of working, what I claim as new, and desire to have secured by Letters Patent, is as follows:

1. A continuous press using rollers for the extraction of oil from seeds, which is composed of a frame, 1, forming the two sides of the press; of crushing-rollers, 2, having interior heating-chambers, H, and placed in series between the two sides of the frame and across the press, and of compressing-rollers, 2', 2², also placed in series and similarly arranged between the two sides of the frame, the upper and lower series of crushing and compressing rollers being in planes normal to each other and slightly convergent toward the outer end of the press, and so that the space between the upper and lower series of crushing-rollers and between the upper and lower belts covering the compressing-rollers becomes gradually smaller toward the outer end of the press; of a lower belt, 3, and an upper belt, 3', to convey the meal from the hopper to the crushing-rollers, and between which belts the meal is compressed to the density of cake, such belts being provided with tightening-boxes; of an adjustable leveling and regulating gage; of adjustable pivoted scrapers extending from side to side of the press and bearing against the belts or rollers; of plates, 17, extending from side to side of the press and forming supports for the cake between scrapers and next rollers; of a system of pipes supplying, in circulation, the heating agent to the interior of the crushing-rollers through packing-boxes and the hollow shafts of the rollers; of a hopper receiving the meal from the cooking and feeding apparatus, and containing a vertically-working helical blade to force the meal down to the lower belt; of a cooking and feeding apparatus adapted to deliver the prepared meal to the hopper of the press in a continuous manner, having a helical conveyer fitted with paddles, 14, and working in a cooking-chamber, 10, surrounded by a heating-chamber, 11, and an interposing air-chamber, 12; and of a frame provided with channels to drain the oil from the top of the cake; all substantially as described and for the purposes set forth.

2. In a continuous press using rollers for the extraction of oil from seeds, the combination with the frame forming the two sides of the press, and the conveying-belts 3 and 3', of an adjustable gage composed of a stationary part, 7, bolted to the frame, and fitting the upper belt, 3', and of an adjustable part, 7', having plates, P, extending downward and upward to cover the slots in sides of press and keep the meal away from them; said adjustable part being fastened to rods, 8, threaded at their upper ends and adapted to move up and down in recesses provided in the sides of the press and worked by set-nuts, 9; the stationary and adjustable parts of the gage forming horizontally an angle forward and against the motion of the belt and meal; substantially as described and for the purposes set forth.

3. In a continuous press using rollers for the extraction of oil from seeds, the combination with the rollers and the adjustable scrapers, of the plates, 17, extending from side to side of the press fastened to the frame and fitted to the rollers and to the adjustable scrapers by segmental surfaces, having their centers of generation along the centers of the rollers and along the centers of the pivots, 15, respectively, and forming, in combination with the scrapers a continuous support for the cake from one crushing-roller to the other; substantially as described and for the purposes set forth.

In witness whereof I have signed this specification, at Denison, this 9th day of July, 1897, in presence of two witnesses.

PIERRE LELARDOUX.

Witnesses:
   M. J. LEONARD,
   M. LELARDOUX.